United States Patent [19]

Matthes et al.

[11] Patent Number: 5,026,533
[45] Date of Patent: Jun. 25, 1991

[54] METHOD AND APPARATUS FOR THE PREPARATION OF DICHLOROSILANE

[75] Inventors: Reinhard Matthes; Reinhold Schork, both of Rheinfelden; Hans-Joachim Vahlensieck, Wehr, all of Fed. Rep. of Germany

[73] Assignee: Hüls Troisdorf AG, Cologne, Fed. Rep. of Germany

[21] Appl. No.: 173,969

[22] Filed: Mar. 28, 1988

[30] Foreign Application Priority Data

Apr. 4, 1987 [DE] Fed. Rep. of Germany ....... 3711444

[51] Int. Cl.$^5$ ............................................. C01B 33/08
[52] U.S. Cl. .................................... 423/342; 502/150
[58] Field of Search ......................................... 423/342

[56] References Cited

U.S. PATENT DOCUMENTS

| 2,627,451 | 2/1953 | Erickson | 423/342 |
| 3,044,845 | 7/1962 | Jex et al. | 423/342 |
| 3,445,200 | 5/1969 | Dunogues | 423/342 |
| 3,704,104 | 6/1970 | Bowa et al. | 423/342 |
| 4,340,574 | 7/1982 | Coleman | 423/342 |

FOREIGN PATENT DOCUMENTS 1189286 6/1985 Canada .
0054650 6/1982 European Pat. Off. .

OTHER PUBLICATIONS

"Concepts in Catalysis", Academic Press Inc., N.Y., 1968; p. 5.

Primary Examiner—Curtis R. Davis
Assistant Examiner—E. D. Irzinski
Attorney, Agent, or Firm—Felfe & Lynch

[57] ABSTRACT

Disclosed are a method and apparatus for the preparation of dichlorosilane by the disproportionation of trichlorosilane at standard pressure and temperatures up to the boiling point of the trichlorosilane in a reactor having a solid-bed catalyst while removing dichlorosilane with contents of trichlorosilane from the gas chamber of the reactor for separation in a distillation column and derivation of liquid reaction phase for the separation of tetrachlorosilane from trichlorosilane in a distillation column with recycling of trichlorosilane into the reactor. Preferably a common distillation column is provided for both separations. The apparatus consists of the solid-bed reactor and the distillation column which is disposed alongside it and in which the receiver for pure tetrachlorosilane, the infeed of liquid reaction phase, the tapping and recycling of trichlorosilane into the reactor, and the input of gaseous dischlorosilane with contents of trichlorosilane are disposed one above the other, and the condenser and the receiver for dichlorosilane are disposed at the top of the column.

15 Claims, 1 Drawing Sheet

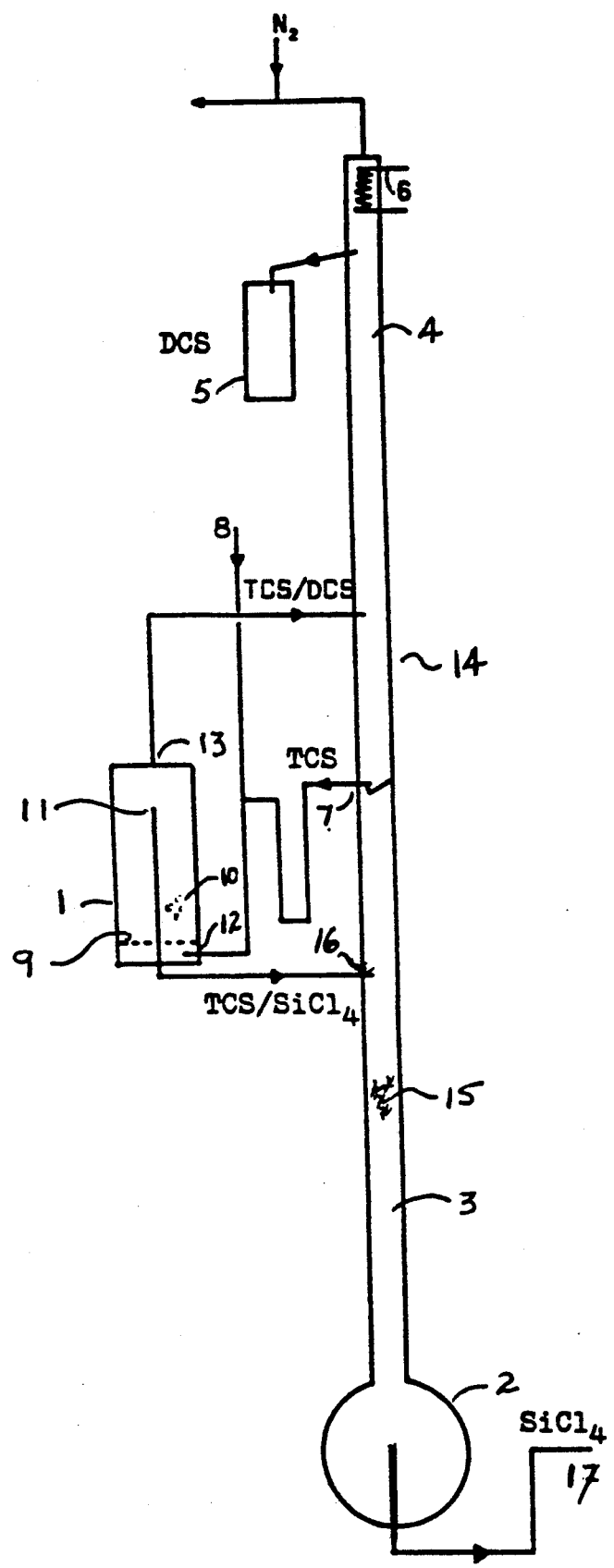

METHOD AND APPARATUS FOR THE PREPARATION OF DICHLOROSILANE

BACKGROUND OF THE INVENTION

Dichlorosilane can be prepared from a reaction of FeSi and HCl. However, such a method of preparation produces a low product yield and requires a great deal of distillation to separate the numerous by-products. It therefore has become common practice to conduct a disproportionation of trichlorosilane on suitable catalysts to dichlorosilane and separate any silicon tetrachloride. However, that reaction is slow to attain equilibrium. Most of the catalysts used are secondary and tertiary amines or quaternary ammonium salts (cf. DE-AS 21 62 537). High temperatures and high pressures are used to accelerate achieving equilibrium and to avoid excessively long residence times in the catalyst bed and in the reactor. The use of a high pressure condition presents a high degree of risk because dichlorosilane and any formed $H_3SiCl$ or $SiH_4$ are selfigniting. Any leakage can result in extremely violent reactions. In flow-through reactors the content of unreacted trichlorosilane is very high. The trichlorosilane has to be repeatedly redistilled with a high energy consumption before a complete transformation is finally achieved.

The problem therefore was to reduce the high cost of energy and especially to reduce the amount of distillation required for the separation of unreacted trichlorosilane.

Another problem was to rapidly establish the equilibrium of the disproportionation and to remove the dichlorosilane immediately after its formation. Still another problem was to reduce the cost of the apparatus.

SUMMARY OF THE INVENTION

The above-stated objects and others can be achieved by the present invention.

The present invention is in a method and apparatus for the preparation of dichlorosilane by the disproportionation of trichlorosilane on a solid catalyst bed. The reaction is conducted in a reactor at a temperature of from 10° C. up to the boiling point of the reaction mixture. The method of the invention can be performed at a pressure of from 0.8 to 1.2 bars, but standard pressure is preferred.

Dichlorosilane in gas form is removed from the reactor and recovered while fractions of trichlorosilane are condensed and recycled to the reactor. A portion of the liquid reaction phase is taken from the reactor and separated into tetrachlorosilane and into trichlorosilane that is recycled to the reactor.

An important feature of the invention is a boiling reaction solution and the prompt removal of dichlorosilane in gas form directly after its formation into a distillation apparatus, trichlorosilane being present in only small amounts in the gas, depending on the temperature during the reaction. The temperature in the reactor should not exceed the boiling point of the reaction mixture, i.e., it is to be no more than 40 to 50° C. The pressure in the reactor and the distillation column is the normal pressure. Air is to be excluded from the reactor and in the distillation column.

From the liquid reaction phase which is TCS at the beginning and a mixture of Si $Cl_4$ and TCS in the equilibrium (depending on the reaction temperature) the tetrachlorosilane formed by the disproportionation has to be separated. Such a separation is achieved by distilling and recycling the trichlorosilane back to the reactor and separating pure tetrachlorosilane from the bulb of the distillation column.

In a preferred embodiment, only an amount of fresh tetrachlorosilane corresponding to that which is to be consumed is fed into the reactor. In a highly preferred embodiment of the process, and preferred design of the apparatus, there is only one distillation column. Pure dichlorosilane (boiling point 8° C.) is taken from the top of the column by cooling in a condensor on the top of the distillation column, in this way being separated from TCS due to the difference of the boiling points (TCS boiling temperature 33° C.). Tetrachlorosilane is removed from the bottom bulb of the column. Condensed trichlorisilane is removed from the column at mid-level through a tap and returned to the lower part of the reactor. In the distillation column, the infeed of the gases composed of dichlorosilane and amounts of trichlorosilane, the point of removal of condensed trichlorosilane, and the infeed of the liquid charge of trichlorosilane and tetrachlorosilane, are situated one over the other at mid-level of the column at a suitable distance apart.

The reactor has an unheated gas chamber in its upper section for condensation of at least a portion of the trichlorosilane. The lower section of the reactor containing the reactants can be heated by a heating jacket. The reactor also has an overflow for the reactor liquid.

The reactor is filled above the sieve plate and up to the level of the liquid with the catalyst bodies which are preferably in the form of balls. The catalyst support can be of numerous materials but preferably consists of $SiO_2$ made from precipitated $SiO_2$ by shaping and drying. Preferably the catalyst support has a surface area of 150 to 250 $m^2/cm^3$.

An alkylamino trialkoxysilane is preferably chemically bound on the catalyst support by condensation in the presence of water, and the prepared catalyst is then carefully dried. Alkylamino trialkoxysilanes with 1 to 20 carbon atoms in the alkylamino group and 1 to 4 carbon atoms, which can be interrupted by oxygen, in the alkoxy group are preferred. Tertiary amines having 1 to 3 carbon atoms in the alkylene group and 1 to 10 carbon atoms in the alkyl group are preferred in the alkylamino group.

The general formula for the catalyst is

$(C_xH_{2x+1}O)_3Si(CH_2)_zN(C_yH_{2y+1})_2$ with x=1 to 4, y=1 to 10, and z=1 to 3.

These catalysts highly accelerate the disproportionation reaction, even at low temperatures.

All traces of moisture are carefully removed from the entire apparatus before the reaction. A protective gas, such as nitrogen, is used during the reaction to prevent access of moisture.

The method of the invention is preferably practiced in an apparatus integrated into one unit. The integrated apparatus is in the form of a single distillation column connected to the reactor with the gas feed above the trichlorosilane tap and the infeed of the liquid reactor contents below the point of removal of trichlorosilane. The distillation column is formed of a column in which dichlorosilane is removed at the top and the trichlorosilane is condensed. That distillation column is stacked vertically onto a distillation column for distilling trichlorosilane and removing tetrachlorosilane from the bottom of the still.

Further subject matter of the invention is in an apparatus for the practice of the method. The apparatus is formed of a solid-bed reactor with a distillation column 5 in fluid connection therewith, such that the feeding of gases from the reactor into the distillation column is disposed above the point of removal of the trichlorosilane which is recycled to the reactor. This column is disposed above the feed of reactor fluid into the distillation column. Dichlorosilane is removed in a condenser at the top of the column. Tetrachlorosilae is removed from the bottom of the distillation bulb.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWING

FIG. 1 generally shows apparatus useful for the practice of the method.

DESCRIPTION OF PREFERRED EMBODIMENT

Referring to the Figure, a reactor 1 has an overflow 11 to allow the overflow of liquid from the reactor and a feed 12 whereby fresh and distilled trichlorosilane is fed into reactor 1. Gaseous reaction products are removed from reactor 1 through a gas take-off 13. The reactor contains a bed of solids 10 (shown only in part) which includes the catalyst composition on a sieve plate 9.

A distillation column 14 is adjacent to reactor 1 and is in fluid communication there with Distillation column 14 has a distillation bulb or boiler 2, a drive off section 3 and a strengthening section 4. Column 14 also has a product receiver 5, a condenser section 6 and a tap 7 Preferably the distillation column is filled with packings 15 only shown in part.

Fresh trichlorosilane is fed into reactor 1 vis line 8 through feed inlet 12. The reactor is heated to boil the charge. The disproportionation reaction takes place in the catalyst bed in reactor 1. The gaseous product formed in the reactor is a mixture of trichlorosilane and dichlorosilane which is removed through the gas take off 13 and led to the strengthening section 4. In the strengthening section 4 DCS is distilled, condensed in the condenser section 6 and collected in the receiver 5; TCS is condensed in the strengthening section 4 and taken off as liquid from tap 7 and led back to the reactor 1 through the feed inlet 12. In the drive off section 3 the mixture of TCS and SiCl$_4$ is introduced as a liquid by the inlet 16. TCS is distilled off and condensed in the strengthening section 4 and taken off as a liquid from tap 7, while SiCl$_4$ is condensed in the drive off section 3 and as pure SiCl$_4$ collected in the boiler 2.

A liquid mixture of trichlorosilane and formed SiCl$_4$ is removed from the reactor by the overflow 13 and is introduced into the drive off section 3 of the column 14 by the inlet 16 just below the take off of liquid trichlorosilane from tap 7 in the middle part of the column. At the beginning SiCl$_4$ is added to the distillation bulb 2 where the SiCl$_4$ is heated to ebulliton and is preferably held at its boiling point of about 56° C. In this way boiling SiCl$_4$ (boiling temperature 56° C.) distills off TCS in the drive off section of the distillation column. During the distillation condensed SiCl$_4$ is collected in bulb 2 and separated off by the overflow 17.

The progress of the distillation is monitored by temperature control. Trouble-free continuous operation is established when the column temperature directly above the inlet of the liquid reaction mixture from the reactor does not exceed or only slightly exceeds 32° C.

The gas room above the liquid level is from ⅓ to ¼ of the height of the reactor; as this part is cooler, a part of TCS which escaped as a gas was condenses and flows back into the reactor.

The catalyst of said general formula on a support, e.g. SiO$_2$ or ceramic can be used generally for reacting TCS in fluid or gaseous phase to form DCS and SiCl$_4$ by disproportionation having 1 to 30 g aminosilane fixed on 100 g of the support. For the present process method and the reactor used known catalyst, e.g. SiO$_2$ or ceramic formed bodies with or without alkoxysilane on the surface can also be used but are less effective.

EXAMPLE 1

In a nitrogen atmosphere the catalyst composition was placed in the reactor. The catalyst has an alkylamino trialkoxysilane of the general formula $(CH_3CH_2O)_3Si(CH_2)_3N(octyl)_2$ 

which had been fixed on SiO$_2$ ball material in the presence of ethanol containing water, and had been vacuum dried. 6.2 g of aminosilane per 100 g of catalyst composition was fixed in this manner. The distillation column was also flushed out with nitrogen.

SiCl$_4$ was introduced into the distillation bulb and heated to ebullition. After refluxing began at the top of the column, trichlorosilane was slowly fed into the reactor, and the disproportionating reaction started up. The reactor was heated sufficiently to boil the charge. Due to the forming of gaseous dichlorosilane a mixture of DCS and TCS was led into the distillation column which also began to operate. The temperature at the top and in the middle of the column dropped, while the automatic column top control provided so that only pure dichlorosilane entered into the receiver.

Simultaneously formed SiCl$_4$ containing TCS was withdrawn at the bottom of the reactor through a continuous overflow and led to the drive off section of the distillation column. In this manner per hour and per 100 g of catalyst composition 32.3 g (0.24 mole) of TCS were converted and 11.2 g (0.11 mole) of DCS ( purity, by gas chromatography: 97.5% DCS, 1.7% H$_3$SiCl, 0.8% TCS) were obtained; furtheron 21.6 g (0.13 mole) of SiCl$_4$ was separated off as pure reuseable product. When after 1 or 3 hours the equilibrium is reached, i.e. at constant temperatures in the reactor and in all parts of the distillation column just the same amount of fresh TCS is added as is reacted.

This result is to be compared with the result obtained by a single passage at 32° C. according to known process conditions under such pressure, that the formed reaction mixture is kept liquid followed by redistillation: The same amount of DCS per 100 g of similar catalyst composition was obtained when 128 g (0.95 mol) of TCS flowed through the same reactor column. This corresponds to four times the amount of TCS, of which ¾ was unused and had to redistilled.

EXAMPLE 2

In this Example, a catalyst composition was used which had been obtained by the hydrolysis of an alkylamino trialkoxysilane of the formula $$(CH_3O)_3Si(CH_2)_3N(C_2H_5)_2$$

in the presence of water with the splitting off of methanol followed by careful vacuum drying on a support of $SiO_2$ balls. The tests on this catalyst were performed in the described apparatus at different reactor heating temperatures. The procedure of example 1 was followed. The results are tabulated below (all data refer to 100 g of catalyst composition):

| Heating temperature °C. | TCS Input g/h | DSC Obtained g/h | SiCl$_4$ g/h |
|---|---|---|---|
| 25 | 42.0 | 14.2 | 25.5 |
| 35 | 76.7 | 26.1 | 49.1 |
| 45 | 100.9 | 34.9 | 60.1 |
| 50 | 101.8 | 35.7 | 61.6 |

Similarly, $(CH_3O)_3Si(CH_2)_2N(C_4H_9)_2$ can be fixed as catalyst on supports of $SiO_2$ or ceramic.

It will be understood that the specification and examples are illustrative but not limitative of the present invention and that other embodiments within the spirit and scope of the invention will suggest themselves to those skilled in the art.

What is claimed is:

1. A method of preparing dichlorosilane comprising:
   introducing trichlorosilane into a reactor having a bed containing a solid catalyst of an alkylamino trialkoxysilane chemically bound to a support material;
   disproportionating the trichlorosilane in the reactor to form a liquid reaction phase and a gas phase containing dichlorosilane and trichlorosilane wherein the reaction is conducted at a temperature of from 10° C. up to the boiling point of the reaction mixture;
   removing the gas phase from the reactor;
   condensing trichlorosilane from the gas phase and recycling the condensed trichlorosilane into the reactor;
   removing at least a portion of the liquid reaction phase from the reactor;
   separating the removed portion of the liquid reaction phase into SiCl$_4$ and trichlorosilane;
   recycling the separated trichlorosilane into the reactor; and
   recovering the dichlorosilane from the gas phase.

2. The method of claim 1 wherein an amount of trichlorosilane corresponding to that consumed by disproportionation is fed as fresh starting material to the reactor.

3. The method of claim 1 wherein the trichlorosilane flows back in part into the upper part of the reactor from the removed gas and the remaining part of trichlorosilane is condensed in a distillation column while pure dichlorosilane is recovered at the top of the distillation column.

4. The method of claim 1 wherein the liquid phase portion removed from the reactor is introduced into a separation apparatus wherein it is separated into trichlorosilane and pure tetrachlorosilane.

5. The method of claim 4 wherein at least a portion of the separated trichlorosilane is condensed and recycled to the reactor.

6. The method of claim 4 wherein the pure tetrachlorosilane is collected and removed from the separation apparatus.

7. The method of claim 6 wherein the separation apparatus is a distillation column.

8. The method of claim 6 wherein the separation apparatus includes a first distillation column and a second distillation column disposed continuously one over the other such that the introduction of the liquid reaction mixture, the removal of condensed and recycled trichlorosilane and the feeding of the removed gases take place one over the other.

9. The method of claim 1 wherein the catalyst is an alkylamino trialkoxysilane of the general formula $$(C_xH_{2x+1}O)_3Si(CH_2)_zN(C_yH_{2y+1})_2$$

with x=1 to 4, y=1 to 10, and z=1 to 3.

10. The method of claim 1 wherein the support material consists of $SiO_2$ bodies.

11. A method of preparing dichlorosilane comprising:
    introducing trichlorosilane into a reactor having a bed containing a solid catalyst of analylamino trialkoxysilane chemically bound to a support material;
    disproportioning the trichlorosilane in the reactor to form a liquid reaction phase and a gas phase containing dichlorosilane and trichlorosilane wherein the reaction is conducted at a temperature of from 10° C. up to the boiling point of the reaction mixture;
    removing the gas phase from the reactor;
    introducing the removed gas into a distillation column comprising at least an upper and lower part, said gas phase being introduced at an upper part thereof;
    condensing trichlorosilane in the distillation column and recycling the condensed trichlorosilane into the reactor;
    removing at least a portion of the liquid reaction phase from the reactor;
    separating the removed portion of the liquid reaction phase into SiCl$_4$ and trichlorosilane in a lower part of the distillation column;
    recycling the separated trichlorosilane into the reactor; and
    recovering the dichlorosilane from the gas phase from the distillation column.

12. The method of claim 11 wherein the upper and lower parts of the column are combined into a single column.

13. The method of claim 11 wherein an amount of trichlorosilane corresponding to that consumed by disproportionation is fed as fresh starting material to the reactor.

14. The method of claim 11 wherein the catalyst is an alkylamino trialkoxysilane of the general formula $$(C_xH_{2x+1}O)_3Si(CH_2)_zN(C_yH_{2y+1})_2$$

with x=1 to 4, y=1 to 10, and z=1 to 3.

15. The method of claim 11 wherein the support material consists of $SiO_2$ bodies.

* * * * *

UNITED STATES PATENT AND TRADEMARK OFFICE
CERTIFICATE OF CORRECTION

PATENT NO.  :  5,026,533
DATED       :  June 25, 1991
INVENTOR(S) :  Reinhard Matthes et al It is certified that error appears in the above-identified patent and that said Letters Patent is hereby corrected as shown below:

Column 3, line 12, "Tetrachlorosilae" should read --Tetrachlorosilane--.

Column 4, line 12, "condenses" should read --condensed--.

Column 5, line 39, "disproportionating" should read --disproportioning--.

Column 6, line 27, "analylamino" should read --an alkylamino--.

Signed and Sealed this

Twenty-sixth Day of January, 1993

Attest:

STEPHEN G. KUNIN

Attesting Officer        Acting Commissioner of Patents and Trademarks